A. Q. LANCASTER.
FRUIT CLIPPER.
APPLICATION FILED FEB. 17, 1912.
1,066,925.
Patented July 8, 1913.
2 SHEETS—SHEET 1.
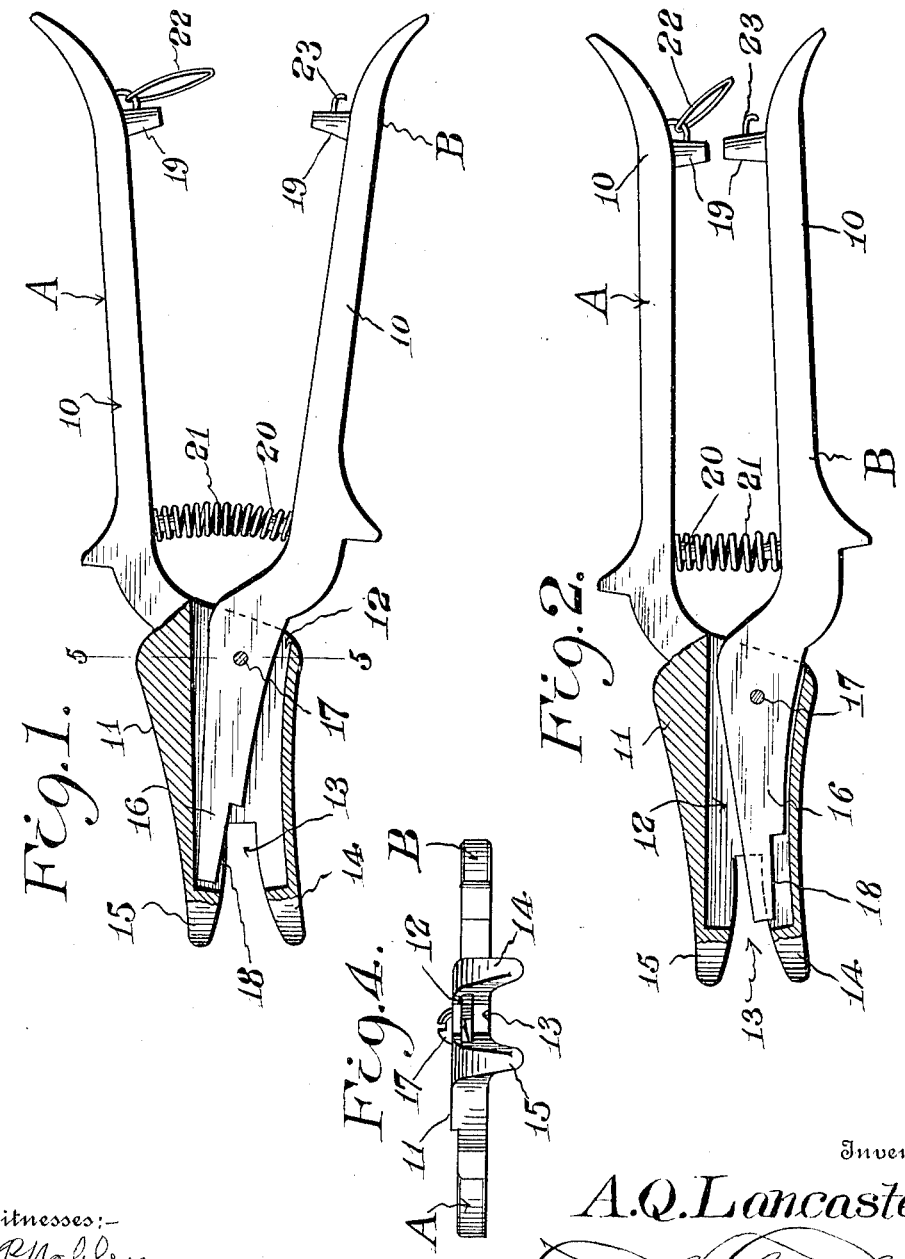
Witnesses:—
Inventor
A.Q. Lancaster
By 
Attorney A. Q. LANCASTER.
FRUIT CLIPPER.
APPLICATION FILED FEB. 17, 1912.
1,066,925.
Patented July 8, 1913.
2 SHEETS—SHEET 2.
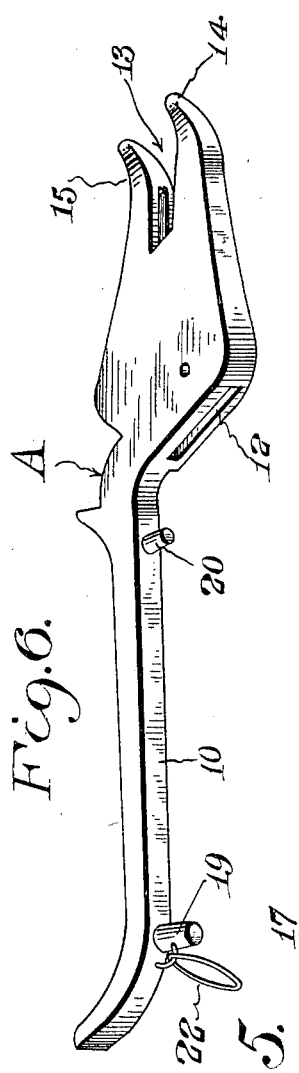
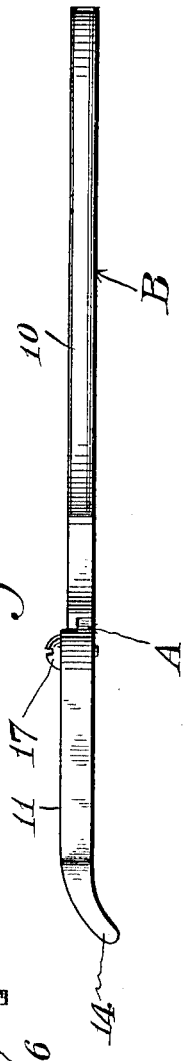
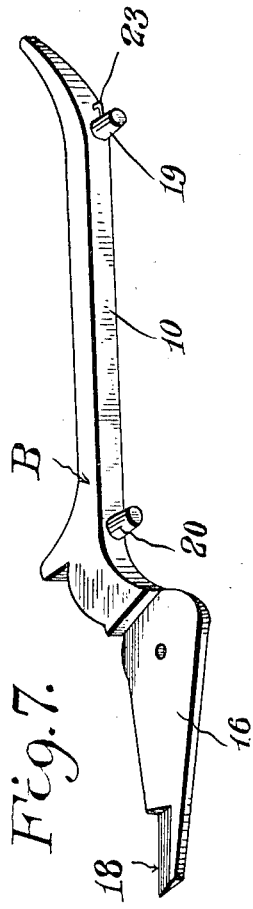
Witnesses:—
J. P. Wahler.
Henry T. Bright.
Inventor
A. Q. Lancaster.
By
Attorney

UNITED STATES PATENT OFFICE.

ARTHER Q. LANCASTER, OF WINDERMERE, FLORIDA.

FRUIT-CLIPPER.

1,066,925.  Specification of Letters Patent.  Patented July 8, 1913.

Application filed February 17, 1912. Serial No. 678,164.

*To all whom it may concern:*

Be it known that I, ARTHER Q. LANCASTER, a citizen of the United States, residing at Windermere, in the county of Orange, State of Florida, have invented certain new and useful Improvements in Fruit-Clippers; and I do hereby declare the following to be a full, clear, and exact description of the invention, such as will enable others skilled in the art to which it appertains to make and use the same.

This invention relates to fruit clippers and particularly to a type adapted for clipping citrus fruit such as oranges.

The object of the invention resides in the provision of a fruit clipper which includes an improved construction whereby the knife element of the clipper is guarded so that same cannot come into contact with the skin of the fruit during the use of the device and which will therefore enable the operator to work with great speed as the necessity of the employment of undue care to avoid injuring the skin of the fruit with the knife element is obviated.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a plan view partly in section of a fruit clipper constructed in accordance with the invention with the parts thereof in a position they would occupy before the clipper is operated to sever the stem of a fruit. Fig. 2, a view similar to Fig. 1 with the parts of the clipper in the position they would occupy after same has been operated to sever the stem of a fruit, Fig. 3, a side view of the clipper, Fig. 4, a forward end view of the clipper, Fig. 5, a section on the line 5—5 of Fig. 1, Fig. 6, a detail perspective view of the guard member of the clipper, and Fig. 7, a detail perspective view of the knife member of the clipper.

Referring to the drawings, the clipper is shown as comprising a guard member A and a knife member B each of which includes a handle end 10. The end of the guard member A remote from the handle end 10 is offset and enlarged as at 11. This enlarged end of the member A is provided with a longitudinal recess 12 which opens through the inner edge thereof and this recess communicates with another recess 13 formed in the outer edge of said enlarged end 11 and producing arms 14 and 15. These arms 14 and 15 are curved outwardly at their free ends so as to slide freely over the fruit in placing the clipper in position to sever the stem. The end of the member B remote from the handle end 10 is also offset and reduced to form a relatively flat portion 16 which tapers from its inner to its outer end and is disposed within the recess 12 of the enlarged end 11 and pivotally connected to the latter by a suitable pin 17. The outer end of the side edge of the portion 16 which is disposed nearest the handle end 10 is sharpened to form a knife edge 18 adapted for movement across the recess 13 when the handle ends 10 of the members A and B are moved toward each other. The handle ends 10 of each of the members A and B are provided at their outer ends with correspondingly inwardly directed studs 19 and at their inner ends with correspondingly inwardly directed studs 20. The outer ends of the studs 19 are adapted to engage each other to limit the movement of the ends 10 toward each other, while the studs 20 enter opposite ends of a spring 21, which latter serves to normally hold the handle ends of the members A and B at their greatest distance away from each other and at the same time normally hold the portion 16 of the member B in the position shown in Fig. 1. The handle ends 10 of the members A and B are adapted to be held at the limit of their movement toward each other against the influence of the spring 21 by means of a loop 22 suitably connected to the stud 19 on the handle end of the member A and adapted to engage over a hook 23 carried by the stud 19 of the member B.

In the use of the clipper the loop 22 is disengaged from the hook 23 and the device applied, with the bent portions of the arms 14 and 15 directed away from the fruit, to bring the stem of the fruit to the inner end of the recess 13. The handles 10 are then operated toward each other so as to move the sharpened edge of the portion 16 across the recess 13, said movement of the sharpened edge serving to sever the stem of the fruit. It will be noted that during the severing operation the stem of the fruit will be supported on opposite sides of the sharpened edge of the portion 16 and therefore the stem will be held against a tendency to bend laterally during the cutting operation.

What is claimed is:

A fruit clipping instrument comprising a pair of pivotally connected arms having corresponding handle ends on one side of their pivotal connection and their other ends disposed on the other side of said pivotal connection, the last named end of one of said arms being enlarged and provided with a longitudinal recess and a second recess in its outer end, the first named recess communicating with the exterior only at the rear of said enlarged end and through said second named recess, and the last named end of the other arm being reduced and disposed in said first named recess and provided with a knife edge for movement across said second named recess and adapted to engage the side edges of the first named recess to limit the movement thereof, and means constantly tending to move the handle ends of said arms away from each other.

In testimony whereof, I affix my signature, in presence of two witnesses.

ARTHER Q. LANCASTER.

Witnesses:
 VICTOR S. STARBUCK,
 RAYMON W. BORTNER.

Copies of this patent may be obtained for five cents each, by addressing the "Commissioner of Patents, Washington, D. C."